(No Model.)

T. W. MOORE.
DEVICE FOR PRESERVING CUT FLOWERS.

No. 408,735. Patented Aug. 13, 1889.

Witnesses

Inventor
Theophilus W. Moore
By his Attorneys

UNITED STATES PATENT OFFICE.

THEOPHILUS W. MOORE, OF FRUIT COVE, FLORIDA.

DEVICE FOR PRESERVING CUT FLOWERS.

SPECIFICATION forming part of Letters Patent No. 408,735, dated August 13, 1889.

Application filed December 31, 1888. Serial No. 295,037. (No model.)

*To all whom it may concern:*

Be it known that I, THEOPHILUS W. MOORE, a citizen of the United States, residing at Fruit Cove, in the county of St. Johns and State of Florida, have invented a new and useful Improvement in Devices for Preserving Cut Flowers, of which the following is a specification.

My invention relates to an improvement in devices for preserving cut flowers and plant-cuttings; and it consists in a bulb of rubber having necks or openings at opposite ends, one of which serves for the introduction of the stems of the plant and the other for the introduction of water or plant-food, as will be more fully set forth hereinafter, and particularly pointed out in the claim.

Figure 1:
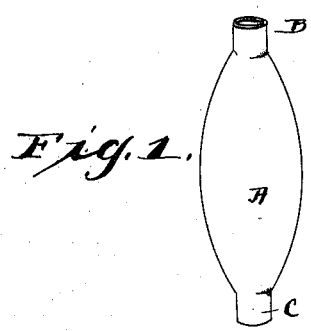
Figure 2:
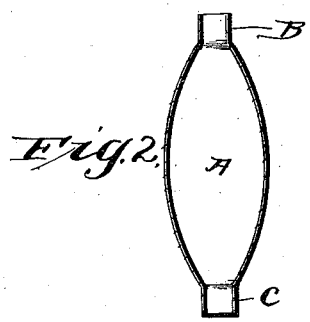
Figure 3:
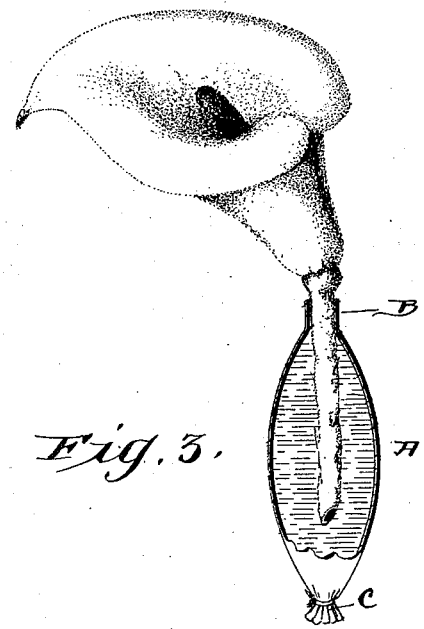

In the accompanying drawings, Figure 1 is a perspective view of my improved bulb for preserving cut flowers and plant-cuttings. Fig. 2 is a sectional view of the same. Fig. 3 is a similar view showing the mode of using the same.

A represents a bulb, which is made of rubber or other suitable elastic flexible material, and is provided at opposite ends with necks B C. The stems of the cut flowers or plant-cuttings are inserted through one of the necks and caused to extend into the bulb, and the said neck is compressed tightly around the stems of the flowers or cuttings to effect a tight joint therewith. Water which may or may not be charged with aqua-ammonia or other plant food is introduced into the bulb by a syringe or small force-pump through the opposite neck of the bulb in sufficient quantities to distend the bulb, and the neck through which the liquid is introduced is then tightly closed and secured by a cork, plug, or by wrapping cord around the same to prevent the escape of the liquid.

The pressure of the bulb on the water or liquid serves to force a greater quantity of the same into the stems of the flowers or cuttings than would be absorbed by them simply by capillary attraction or simple absorption, and the result is that the fluid is supplied to the cut flowers or plant-cuttings in such quantities as to preserve their freshness and vitality much longer than by the ordinary method.

A bulb thus constructed is very cheap and simple, and will be found of great utility and value for preserving cut flowers and plant-cuttings during transportation over long distances. It will also be found of great utility and convenience for preserving bouquets for house decoration and for personal wear.

Having thus described my invention, I claim—

The flower-preserving device herein described, the same comprising a bulb A, having an elastic neck B at its upper end, grasping the stem of the flowers and making a water-tight connection therewith, a neck C at its lower end, adapted to be closed by a cord c or the like, the bulb being filled with an amount of water sufficient to distend the same, whereby the elasticity of said bulb will press upon the water and force it into the stem of the flower, substantially as described.

In testimony that I claim the foregoing as my own I have hereto affixed my signature in presence of two witnesses.

THEOPHILUS W. MOORE.

Witnesses:
C. M. BROWN,
A. BELKNAP.